(12) United States Patent
Ko

(10) Patent No.: US 12,195,024 B2
(45) Date of Patent: Jan. 14, 2025

(54) METHOD AND SYSTEM FOR PROVIDING A CONNECTED CAR SERVICE

(71) Applicants: HYUNDAI MOTOR COMPANY, Seoul (KR); KIA CORPORATION, Seoul (KR)

(72) Inventor: Jaeyoon Ko, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 662 days.

(21) Appl. No.: 17/331,111

(22) Filed: May 26, 2021

(65) Prior Publication Data

US 2022/0204012 A1 Jun. 30, 2022

(30) Foreign Application Priority Data

Dec. 24, 2020 (KR) .................. 10-2020-0182777

(51) Int. Cl.
| | |
|---|---|
| *B60W 50/14* | (2020.01) |
| *G06F 8/65* | (2018.01) |
| *G06Q 50/40* | (2024.01) |
| *G07C 5/00* | (2006.01) |
| *H04W 4/40* | (2018.01) |

(52) U.S. Cl.
CPC .............. *B60W 50/14* (2013.01); *G06F 8/65* (2013.01); *G06Q 50/40* (2024.01); *G07C 5/008* (2013.01); *H04W 4/40* (2018.02); *B60W 2050/146* (2013.01)

(58) Field of Classification Search
CPC .............. B60W 50/14; B60W 2050/146; G06F 8/65; G06Q 50/30; G07C 5/008; H04W 4/40; H04W 4/029; H04L 67/12; H04L 67/535; G08G 1/09675; G08G 1/096775
See application file for complete search history.

(56) References Cited

U.S. PATENT DOCUMENTS

2020/0159251 A1* 5/2020 Iwasaki ................. B60R 16/037

FOREIGN PATENT DOCUMENTS

| CN | 110356346 A * 10/2019 ........... B60R 16/037 |
|---|---|
| DE | 102018206557 A1 * 10/2019 ............. B60R 16/02 |
| EP | 1607893 A1 * 12/2005 ............. G01C 21/26 |

* cited by examiner

*Primary Examiner* — Anne Marie Antonucci
*Assistant Examiner* — Kirsten Jade M Santos
(74) *Attorney, Agent, or Firm* — Lempia Summerfield Katz LLC

(57) ABSTRACT

A method and system for providing a connected car service may include a connected car terminal configured to generate a first list of services/functions applied to a vehicle and to generate usage status information of services/functions included in the first list, and may include a connected car server configured to identify an unused service/function among the services/functions included in the first list based on the usage status information, and to transfer usage guidance information for guiding a using method with respect to the unused service/function to a user terminal of the user of the connected car terminal.

14 Claims, 2 Drawing Sheets

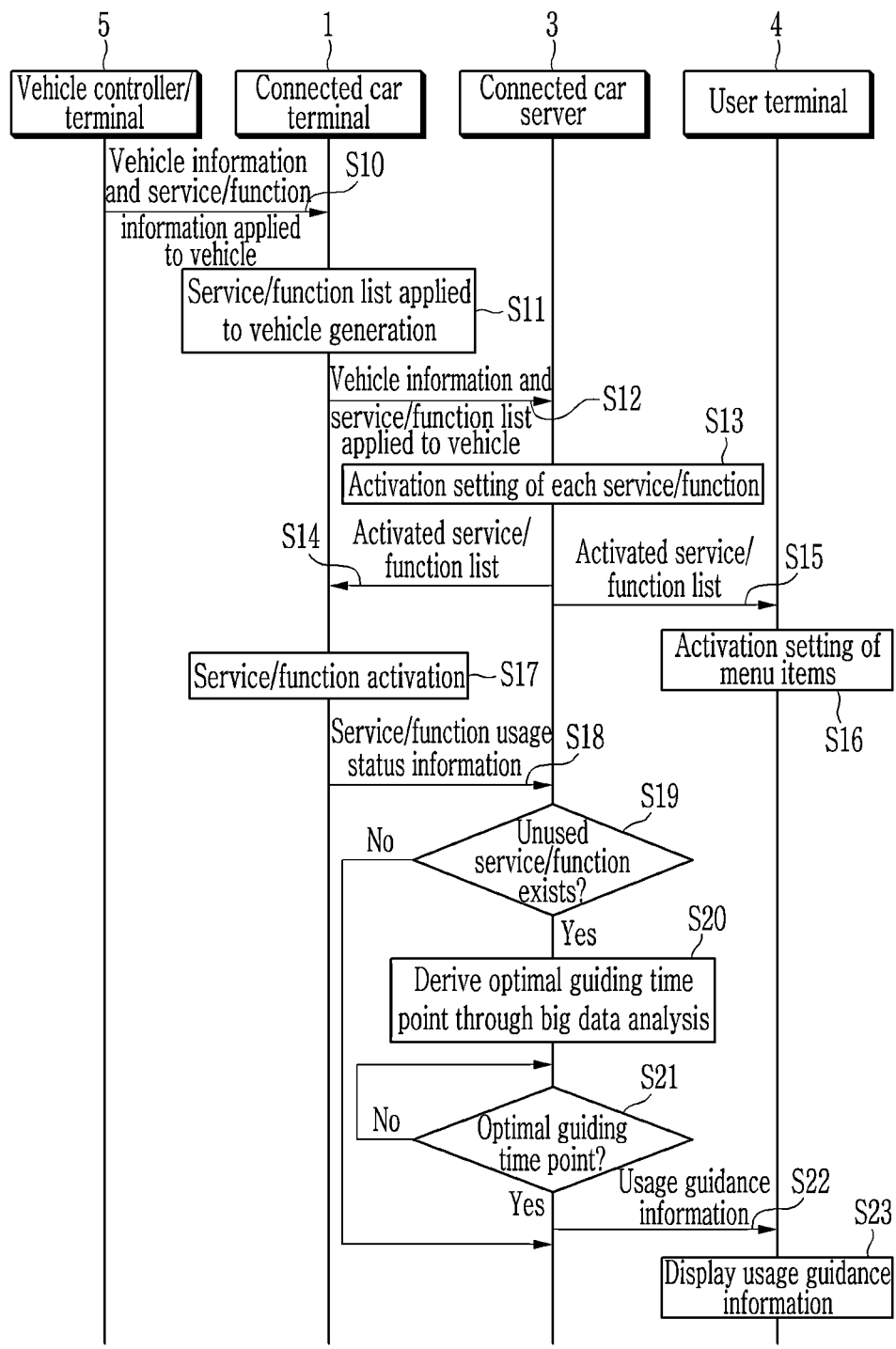

METHOD AND SYSTEM FOR PROVIDING A CONNECTED CAR SERVICE

CROSS-REFERENCE TO RELATED APPLICATION

This application claims priority to and the benefit of Korean Patent Application No. 10-2020-0182777 filed in the Korean Intellectual Property Office on Dec. 24, 2020, the entire contents of which are incorporated herein by reference.

BACKGROUND

(a) Field of the Disclosure

The present disclosure relates to a method and system for providing a connected car service.

(b) Description of the Related Art

Recently, as connected car services applied to vehicles have been diversified, there are cases in which some functions/services cannot be used because customers do not recognize all the functions/services being applied. In order to use the function/service provided by the connected car service, a separate customer consent is required, or when the customer has to subscribe to an additional service separately. In addition, when a separate activation process has to be performed for the customer to use a specific function/service performed, the customer may have difficulty in using the function/service.

Particularly, when a function/service is added by software update of a vehicle controller/terminal providing a connected car service, or when a vehicle controller/terminal providing a connected car service is additionally mounted after initial production, a customer has to perform a separate activation process for the added function/service in order to normally use the function/service. However, there may be cases where the customer does not recognize this and cannot use the function/service.

The above information disclosed in this Background section is only to enhance understanding of the background of the present disclosure. Therefore, the Background section may contain information that does not form the prior art that is already known in this country to a person of ordinary skill in the art.

SUMMARY OF THE INVENTION

The present disclosure has been made in an effort to provide a method and server for providing a connected car service having advantages of increasing a usage rate of users for a service/function provided by a connected car service.

A system for providing a connected car service may include a connected car terminal configured to generate a first list of services/functions applied to a vehicle and to generate usage status information of services/functions included in the first list. The system may also include a connected car server configured to identify an unused service/function among the services/functions included in the first list based on the usage status information and to transfer usage guidance information for guiding a using method with respect to the unused service/function to a user terminal of the user of the connected car terminal.

The system may further include a contents providing server configured to provide contents including at least one of weather information, traffic information, disaster information, or news information. The connected car terminal may transmit vehicle information including at least one of position information and state information of the vehicle or road information of a road on which the vehicle is driving, to the connected car server. The connected car server ay determine a time point for transferring the usage guidance information to the user terminal based on a usage pattern with respect to the unused service function of other users who uses the unused service/function as well as the contents and the vehicle information.

When the unused service/function is in the deactivated state within the vehicle, the connected car server may be configured to further include information on a method for activating the unused service/function in the usage guidance information to be transferred.

The connected car server may be configured to set at least one among the services/functions included in the first list to an activated state based on vehicle type of the vehicle, platform or version of the connected car terminal, and the user's subscribed fee plan information, and to transfer activation information with respect to services/functions included in the first list to the connected car terminal. The connected car terminal may be configured to automatically activate at least one service/function applied to the vehicle based on the activation information.

The connected car server may be configured to transfer the activation information to the user terminal. The user terminal may be configured to activate at least one menu item among menu items of a connected car service APP based on the activation information.

When a new service/function is applied within the vehicle due to installation of a new vehicle controller/terminal or the connected car terminal to the vehicle or a software update of the vehicle controller/terminal within the vehicle, the connected car terminal may be configured to transfer a second list including the new service/function to the connected car server. The connected car server may be configured to determine an activation state of the new service/function based on the vehicle type, the platform, the version, and the fee plan information, and to transfer activation information on the new service/function to the connected car terminal.

The connected car terminal may be configured to automatically activate the new service/function or maintain the new service/function to the deactivated state, based on activation information on the new service/function.

A method of a connected car server for providing a connected car service may include: receiving usage status information of services/functions applied within a vehicle from a connected car terminal; identifying an unused service/function among the services/functions based on the usage status information; and transferring usage guidance information for guiding a using method with respect to the unused service/function to a user terminal of the user of the connected car terminal.

The method may further include receiving vehicle information including at least one of position information and state information of the vehicle or road information of a road on which the vehicle is running from the connected car. The method may also include determining an optimal guiding time point for transferring the usage guidance information to the user terminal based on a usage pattern with respect to the unused service function of other users who uses the unused service/function, contents provided from the contents providing server, and the vehicle information, The transferring may include transferring the usage guidance information to the user terminal at the optimal guiding time point. The contents may include at least one of weather information, traffic information, disaster information, or news information.

When the unused service/function is in the deactivated state within the vehicle, the usage guidance information may further include information on a method for activating the unused service/function in the usage guidance information.

The method may further include: receiving a first list of services/functions applied to the vehicle from the connected car terminal; setting at least one among the services/functions included in the first list to an activated state based on vehicle type of the vehicle, platform or version of the connected car terminal, and the user's subscribed fee plan information; and transferring activation information with respect to services/functions included in the first list to the connected car terminal.

The connected car terminal may be configured to automatically activate at least one service/function applied to the vehicle based on the activation information.

The method may further include transferring the activation information to the user terminal. The user terminal may be configured to activate at least one menu item among menu items of a connected car service APP based on the activation information.

The method for providing a connected car service may further include: receiving a second list including the new service/function from the connected car terminal according as a new service/function is applied within the vehicle due to installation of a new vehicle controller/terminal or the connected car terminal to the vehicle or a software update of the vehicle controller/terminal within the vehicle; determining an activation state of the new service/function based on the vehicle type, the platform, the version, and the fee plan information; and transferring activation information on the new service/function to the connected car terminal.

The connected car terminal may automatically activate the new service/function or maintain the new service/function to the deactivated state, based on activation information on the new service/function.

According to an embodiment, by actively inducing the use of unused services/functions, user's usage rates for services/functions provided b the connected car service may be increased without the user's complete understanding of the system.

BRIEF DESCRIPTION OF THE DRAWINGS

FIG. 2 illustrates a method for providing a connected car service according to an embodiment.

DETAILED DESCRIPTION OF THE EMBODIMENTS

Figure 1:
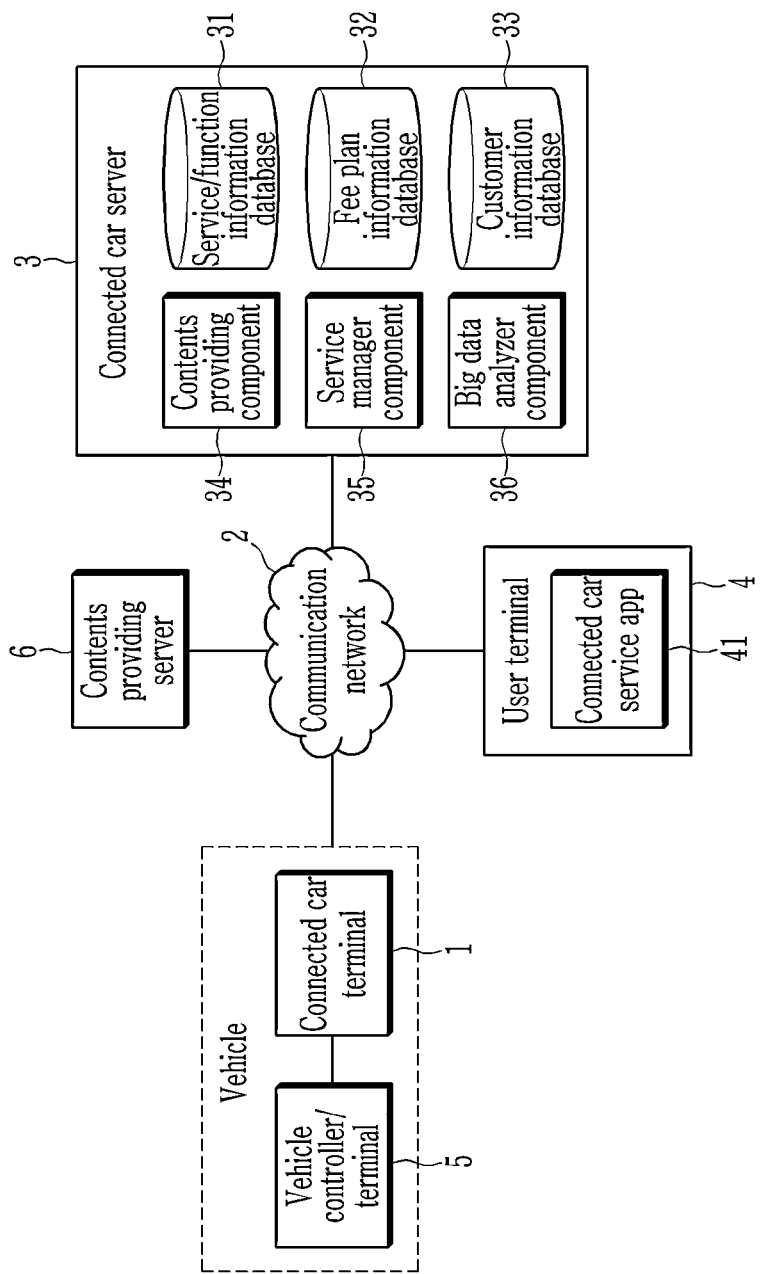
FIG. 1 schematically illustrates a connected car service system according to an embodiment.

The present disclosure is described more fully hereinafter with reference to the accompanying drawings, in which specific embodiments of the disclosure are shown. As those have ordinary skill in the art should realize, the described embodiments may be modified in various different ways, all without departing from the spirit or scope of the present disclosure.

In order to clarify the present disclosure, parts that are not related to the description have been omitted. Also, the same elements or equivalents are referred to with the same reference numerals throughout the specification.

Throughout this specification and the claims that follow, when it is described that an element is "coupled" to another element, the element may be "directly coupled" to the other element or "indirectly coupled" to the other element through a third element. In addition, unless explicitly described to the contrary, the word "comprise", and variations such as "comprises" or "comprising", should be understood to imply the inclusion of stated elements but not the exclusion of any other elements. When a component, device, element, or the like of the present disclosure is described as having a purpose or performing an operation, function, or the like, the component, device, or element should be considered herein as being "configured to" meet that purpose or to perform that operation or function. Further, the controller described herein may include a processor programmed to perform the noted operations, functions, or the like.

Hereinafter, a method and system for providing a connected car service according to an embodiment of the present disclosure are described with reference to the accompanying drawings.

FIG. 1 schematically illustrates the connected car service system according to an embodiment. For the sake of convenience of description, FIG. 1 illustrates an example that one connected car terminal 1 is coupled to a connected car server 3 and one vehicle controller/terminal 5 is coupled to the connected car terminal 1. However, it should be understood that this is merely an example, and at least one connected car terminal 1 may be coupled to the connected car server 3, and at least one vehicle controller/terminal 5 may be coupled to each connected car terminal 1.

As shown in FIG. 1, in a system for providing the connected car service according to an embodiment of the present disclosure, the connected car terminal 1 is installed on the vehicle and may communicate with the vehicle controller/terminal 5 in the vehicle. In addition, the connected car terminal 1 may communicate with the connected car server 3 or a user terminal 4 through a communication network 2 provided by a communication company. For example, the connected car terminal 1 may communicate with the connected car server 3 through a wireless network.

The connected car terminal 1 may collect, in cooperation with the vehicle controller/terminal 5, position information and state information (e.g., parked, running, occupant information, door opened/closed) of the vehicle, road information of the road on which the vehicle is currently running, and the like. When having collected the position information and state information of the vehicle, the road information of the road on which the vehicle is running, and the like, the connected car terminal 1 may transfer them to the connected car server 3.

The connected car terminal 1 manages, by a table, a list of services/functions applied to the vehicle installed with the connected car terminal 1, i.e., available at the vehicle, and may provide the list of services/functions applied to the vehicle to the connected car server 3 through the communication network 2. For this purpose, the connected car terminal 1 may check, in cooperation with the vehicle controller/terminal 5, whether each vehicle controller/terminal 5 is installed, and services/functions of the connected car service applied to the vehicle installed with the connected car terminal 1. When additionally installed on the vehicle or when a new service/function for the connected car service is added by a software update, the vehicle controller/terminal 5 may transfer information on the newly added service/function to the connected car terminal 1, In addition, the connected car terminal 1 may obtain, in cooperation with the vehicle controller/terminal 5 in the corresponding vehicle, the connected car service usage status, i.e., information on user's usage status with respect to services/functions provided by the connected car service.

Table 1 below shows an example of the list of services/functions that the connected car terminal 1 transfers to the connected car server 3.

TABLE 1

| service/function | activation/deactivation | usage status |
|---|---|---|
| a | Activated | Used |
| b | Activated | Used |
| c | Activated | Unused |
| d | Activated | Unused |
| e | Activated | Used |
| f | Activated | Used |
| z | Activated | Used |
| a+ | Newly added, Activated | Used |
| c+ | Newly added, Activated | Used |
| x | Newly added, Separate Activation required | Unused |
| y | Newly added, Activated | Used |
| t | Newly added, Activated | Used |

Referring to table 1, when transferring the list of services/functions available at the vehicle to the connected car server 3, the connected car terminal 1 may transmit by additionally including information on whether each service/function is newly added, activated or not, and usage status. The connected car server 3 may communicate with the connected car terminal 1, the user terminal 4, or a contents providing server 6, through the communication network 2.

The connected car server 3 may provide information received from the contents providing server 6 to each connected car terminal 1 based on the vehicle position. For this purpose, the connected car server 3 may include a contents providing component 34.

The contents providing component 34 may transfer contents such as weather information, traffic information, disaster information, news information, and the like provided from the contents providing server 6 to each connected car terminal 1. At this time, the contents providing component 34 receives position information of the corresponding vehicle from each connected car terminal 1, and based on such, may provide information provided from the contents providing server 6 to each connected car terminal 1.

The connected car server 3 may manage services/functions that may be provided by each connected car terminal 1, based on vehicle type, platform and version (hardware version or software version) of each connected car terminal 1 or the vehicle controller/terminal 5, user's subscribed fee plan of each connected car terminal 1, and the like. For this purpose, the connected car server 3 may further include a service/function information database 31, a fee plan information database 32, a customer information database 33, and a service manager component 35.

The service/function information database 31 may separately store and manage the list of services/functions available in the connected car service for each vehicle type, platform, or version (terminal version or software version).

The fee plan information database 32 may separately store and manage the list of services/functions available in the connected car service for each fee plan.

By using each connected car terminal 1, the customer information database 33 may store and manage customer information of user provided with the connected car service for each customer. The customer information stored in the customer information database 33 may include demographic information (demographic information such as age, gender, marital status, address, and the like, and the like) of each user who subscribed to the connected car service, vehicle information (vehicle model information, passenger/SUV classification information, displacement information, model year information, engine type information, and the like), each user's subscribed fee plan information, and the like. In addition, the customer information stored in the customer information database 33 may include data received from the connected car terminal 1 of each user, such as for example, the list of services/functions applied to the corresponding vehicle, the position information and state information of the vehicle, road information of the road on which the vehicle is currently running, and the like.

The service manager component 35 receives the list of services/functions applied to the vehicle installed with a corresponding terminal from each connected car terminal 1 and may store it in the customer information database 33. The service manager component 35 compares the service/function list received from each connected car terminal 1 with the service/function lists stored in the service/function information database 31. When an item in the service/function list received from the connected car terminal does not exist in the list of the corresponding vehicle type, platform, or version (terminal version or software version), the corresponding item may be added to the service/function list of the corresponding vehicle type, platform, or version (terminal version or software version).

Among services/functions constituting the connected car service, there may be items of which usage is limited according to vehicle type, platform, version (terminal version or software version), user's subscribed fee plan, and the like. Therefore, the service manager component 35 checks the vehicle type, platform, version (terminal version or software version), user's subscribed fee plan information, and the like corresponding to the connected car terminal 1 from the customer information database 33. Based on such, the service manager component 35 can identify services/functions that may be activated, among the services/functions applied to the vehicle of the connected car terminal 1. The service manager component 35 may set, to an activated state, at least one service/function identified as capable of being activated among the services/functions applied to the connected car terminal 1. In addition, the service manager component 35 may provide activated state information of respective services/functions to the connected car terminal 1 and the user terminal 4 of the user who uses it.

The connected car service application (APP) 41 of the user terminal 4 that received such may automatically activate and provide only menu items of services/functions available through a corresponding connected car terminal 1 among the entire menu items. In addition, the connected car terminal 1 may automatically activate the service/function set to the activated state by the connected car server 3, among the services/functions applied to the vehicle of the connected car terminal 1.

The connected car server 3 may induce usage of an unused service/function, through a big data analysis for the service/function usage status of each connected car terminal 1. For this purpose, the connected car server 3 may further include a big data analyzer component 36, i.e., a data analyzer component capable of handling large amounts of data.

The big data analyzer component 36 may collect the connected car service usage status information, the position information and state information of the vehicle, the road information of the road on which the vehicle is running, and the like, from each connected car terminal 1 or the user terminal 4, and may store them in the customer information database 33. The big data analyzer component 36 may perform the big data analysis using such collected information.

With reference to the big data analysis result for information (the position information and state information of the vehicle, the road information of the road on which the vehicle is running, service usage status information, and the like) collected from each connected car terminal 1 or the user terminal 4, and information (for example, weather information, disaster information, and the like) provided from the contents providing server 6, the big data analyzer component 36 may identify a currently unused service/function among the services/functions of the connected car service that may be used by the user. The big data analyzer component 36 may estimate an optimal guiding time point of usage guidance information for the unused service/function.

Through the big data analysis for information collected from each connected car terminal 1 or the user terminal 4, the big data analyzer component 36 may identify a service/function that is in a deactivated state, or unused while in the activated state, among the services/functions that may be used by the user through the connected car terminal 1.

Through the big data analysis for the customer information stored in the customer information database 33, the big data analyzer component 36 may obtain usage pattern (for example, frequently used time point, surrounding environment information during usage, and the like) of users who use the corresponding service/function, for each service/function. In addition, the big data analyzer component 36 performs a big data analysis, in which the vehicle information collected through the connected car terminal 1 or the user terminal 4 of each user and vehicle surrounding environment information are compared with usage pattern information of users for each service/function, and similarity thereof is analyzed. The information of the vehicle may include, for example, position information, state information, and the like of the vehicle. The vehicle surrounding environment information may include, for example, weather information, disaster information, traffic information, and the like, provided from the contents providing server 6. Based on a result of such analysis, the big data analyzer component 36 may derive a required time point or an optimal use time point of a corresponding service/function, with respect to each service/function that is unused by a corresponding user. In addition, based on the required time point or optimal use time point, or the like, of each service/function derived as such, the big data analyzer component 36 may derive the optimal guiding time point that is optimal for guiding, to the corresponding user, the service/function that is unused by the user.

With respect to a service/function that is in the activated state but unused, or that is available but deactivated in each connected car terminal 1 or the user terminal 4, as described above, the big data analyzer component 36 may provide usage guidance information that induces usage to the corresponding connected car terminal 1 or the user terminal 4, at the optimal guiding time point obtained by the big data analysis. Here, usage guidance information is transferred to the connected car terminal 1 or the user terminal 4 in the form of a text message, a push message, and the like, and may include information on the corresponding service/function and guide information on a using method. In addition, when separate subscription or function activation is required for the corresponding service/function to be activated, the usage guidance information may further include guide information on a subscription method or an activation method. In addition, the usage guidance information may further include link information that is linked to an execution menu for the corresponding service/function, an activation menu for the corresponding service/function, or a subscription menu to use the corresponding service/function, and the like.

Upon receiving the above-described the usage guidance information from the connected car server 3, the user terminal 4 or the connected car terminal 1 may display it on a screen. Therefore, the user who found the service/function that is not used by the user may use the corresponding service/function, or may use the service after activation according to the guided activation method when the activation is required for the function/service.

FIG. 2 schematically illustrates a method for providing the connected car service according to an embodiment. The method for providing the connected car service of FIG. 2 may be performed by the system described above with reference to FIG. 1.

Referring to FIG. 2, at step S10, the vehicle controller/terminal 5 providing the connected car service may transfer, to the corresponding connected car terminal 1, vehicle information (the position information and state information of the vehicle, the road information of the road on which the vehicle is running, and the like) of the corresponding vehicle, or information on services/functions applied to the corresponding vehicle.

At the step S10, when the vehicle controller/terminal 5 is newly installed to a vehicle, or when services/functions supported by the vehicle controller/terminal 5 are changed due to a software update, the vehicle controller/terminal 5 may transmit information on newly added or changed services/functions to the connected car terminal 1.

At step S11, the connected car terminal 1 collects vehicle information or information on services/functions applied to the vehicle from the vehicle controller/terminal 5, and based on such, generates a corresponding service/function list applied to vehicle. At step S12, the connected car terminal 1 may transfer the vehicle information collected from the vehicle controller/terminal 5 as well as the service/function list applied to vehicle to the connected car server 3.

At the step S11, the connected car terminal 1 initially transfers a list for all services/functions applied to the vehicle to the connected car server 3. Thereafter, the connected car terminal 1 may transfer only a list of services/functions that are updated or newly added to the vehicle, to the connected car server 3.

After receiving the vehicle information of the corresponding vehicle as well as the corresponding service/function list applied to vehicle from the connected car terminal 1, the connected car server 3 may store them in the customer information database 33.

At step S13, based on the service/function list received from the connected car terminal and fee plan information corresponding to corresponding user's subscribed fee plan, the connected car server 3 may set services/functions available for the corresponding user to the activated state.

In addition, at steps S14 and S15, the connected car server 3 may transfer the activated service/function list to the corresponding connected car terminal 1 and the user terminal 4 of the user who uses it.

At the step S13, the connected car server 3 checks the vehicle type, platform, version (terminal version or software version), user's subscribed fee plan information corresponding to each connected car terminal 1, from the customer information database 33, and based on such, may identify services/functions that may be automatically activated, among the services/functions applied to the vehicle of each connected car terminal 1. In addition, the connected car server 3 may set, to the activated state, at least one service/function identified as capable of automatic activation among the services/functions applied to the connected car terminal 1.

Thereafter, upon receiving the list of activated services/functions from the connected car server 3, the user terminal 4 may set, at step S16, based on such, among entire menu items provided through the connected car service APP 41, only menu items corresponding to the activated service/function to the activated state, and provide the service to the user.

At step S17, the connected car terminal 1 may automatically activate at least one service/function based on the list received from the connected car server 3. Subsequently, at step 318, the connected car terminal 1 periodically obtains usage status information on respective services/functions in cooperation with the vehicle controller/terminal 5 and may provide the obtained usage status information to the connected car server 3.

At step S19, the connected car server 3 that has received it checks whether an unused service/function exists among services/functions available at the connected car terminal 1. At step S20, when the unused service/function exists, the connected car server 3 may estimate the optimal guiding time point of the usage guidance information with respect to the corresponding service/function through the big data analysis.

At the step S19, the connected car server 3 may identify a service/function that is in the activated state but unused, or that is in the deactivated state through the big data analysis for information collected from each connected car terminal 1 or the user terminal 4, among the services/functions that may be used by the user through the connected car terminal 1.

At the step S20, through the big data analysis for the customer information stored in the customer information database 33, the connected car server 3 may obtain usage pattern (for example, frequently used time point, surrounding environment information during usage, and the like) of users who use the corresponding service/function, for each service/function. In addition, the connected car server 3 compares information (position information, state information, and the like of the vehicle) collected through the connected car terminal 1 or the user terminal 4 as well as vehicle surrounding environment information (weather information, disaster information, traffic information, and the like, provided from the contents providing server 6) with usage pattern information of users for each service/function. The connected car server 3 may derive, based on the comparison result, the optimal guiding time point for each service/function that is unused.

Thereafter, the optimal guiding time point derived through the step S19 is reached at step S21, the connected car server 3 may provide, at step S22, the usage guidance information for inducing usage of the unused service/function to the user terminal 4.

At step S23, the user terminal 4 may display the received usage guidance information on a display through the connected car service APP 41. Therefore, the user who found the service/function that is not used by the user may use the corresponding service/function, or may use the service after activation according to the guided activation method when the activation is required for the function/service.

Hereinafter, an example of providing the connected car service in the connected car service system according to an embodiment is described in detail.

During an initial set up, the connected car terminal 1 generates, in cooperation with the vehicle controller/terminal 5 in the vehicle, a list of services/functions applicable in the vehicle installed with the connected car terminal 1 as shown in Table 2 below.

TABLE 2

| service/function | Applied or not (On/Off) | Activated or not (On/Off) |
|---|---|---|
| sos | On | Off |
| vehicle diagnosis | On | Off |
| remote start | On | Off |
| remote door opening | On | Off |

Referring to the above Table 2, the vehicle installed with the connected car terminal 1 is applied with services/functions of "sos", "vehicle diagnosis", "remote start", and "remote door opening" as the connected car service functions, and these services/functions are in the deactivated state at the time of initial set up. When the service/function list applied to vehicle of the connected car terminal 1 is generated, the connected car terminal 1 transfers it to the connected car server 3. Then, the connected car server 3 checks the vehicle type, platform, version, subscription fee plan, and the like corresponding to the connected car terminal 1 from the customer information database 33. In addition, the connected car server 3 checks, based on the vehicle type, platform, version, user's subscribed fee plan, and the like corresponding to the connected car terminal 1, a service/function list that may be activated at the connected car terminal 1. Based on such, the connected car server 3 sets to be activated or not the services/functions included in the service/function list received from the connected car terminal 1. For example, when all the services/functions of "sos", "vehicle diagnosis", "remote start", and "remote door opening" may be used, the connected car server 3 may set all the services/functions of "sos", "vehicle diagnosis", "remote start", and "remote door opening", to the activated state, as shown in Table 3 below.

TABLE 3

| service/function | Applied or not (On/Off) | Activated or not (On/Off) |
|---|---|---|
| sos | On | On |
| vehicle diagnosis | On | On |
| remote start | On | On |
| remote door opening | On | On |

When the activation setting for each service/function is completed, the connected car server 3 transfers information on the activated service/function to the connected car terminal 1 and the user terminal 4, as described above. Then, the connected car terminal 1 switches corresponding service/function to the activated state, based on the received activation information. Subsequently, since services/functions of "svm-based vehicle surrounding image check" and "rear seat passenger notification" are newly applied to the vehicle due to a software update of the vehicle controller/terminal 5 or the connected car terminal 1, the connected car terminal 1 transfers a service/function list updated in consideration of the newly added services/functions, as shown in Table 4 below.

TABLE 4

| service/function | Applied or not (on/off) | Activated or not (on/off) |
|---|---|---|
| sos | On | On |
| vehicle diagnosis | On | On |
| remote start | On | On |
| remote door opening | On | On |
| svm-based vehicle surrounding image check | On (newly added) | Off |
| rear seat passenger notification | On (newly added) | Off |

At this time, the services/functions of "svm-based vehicle surrounding image check" and "rear seat passenger notification" are not yet set to be activated. Upon receiving the updated service/function list from the connected car terminal 1, the connected car server 3 checks services/functions that may be activated for the vehicle type, platform, version, and subscription fee plan corresponding to the connected car terminal 1. Based on such, the connected car server 3 sets to be activated or not the newly added services/functions. For example, as shown in Table 5 below, while the newly added service/function of "svm-based vehicle surrounding image check" may be activated, the service/function of "rear seat passenger notification" may not be set to the activated state because the customer's separate consent, activation processing, or subscription to the fee plan is required.

TABLE 5

| service/function | Applied or not (on/off) | Activated or not (on/off) |
|---|---|---|
| sos | On | On |
| vehicle diagnosis | On | On |
| remote start | On | On |
| remote door opening | On | On |
| svm-based vehicle surrounding image check | On (newly added) | On |
| rear seat passenger notification | On (newly added) | Off |

When activation setting for the newly added service/function is completed, as described above, the connected car server 3 transfers information on the activated service/function to the connected car terminal 1 and the user terminal 4. Then, the connected car terminal 1 updates the activation state with respect to the newly added service/function, based on the received activation information. In other words, the connected car terminal 1 switches the service/function of "svm-based vehicle surrounding image check" among the newly added services/functions to the activated state and maintains the deactivated state of the service/function of "rear seat passenger notification". Thereafter, the connected car terminal 1 identifies the usage status of services/functions applied to the vehicle of the connected car terminal 1 and generates the identified usage status information as Table 6 below, to transfer it to the connected car server 3.

TABLE 6

| service/function | Applied or not (on/off) | Activated or not (on/off) | Used or unused |
|---|---|---|---|
| sos | On | On | Used |
| vehicle diagnosis | On | On | Used |
| remote start | On | On | Used |
| remote door opening | On | On | Used |

TABLE 6-continued

| service/function | Applied or not (on/off) | Activated or not (on/off) | Used or unused |
|---|---|---|---|
| svm-based vehicle surrounding image check | On | On | Unused |
| rear seat passenger notification | On | Off | Unused |

Upon receiving the usage status information of the services/functions from the connected car terminal 1, the connected car server 3 may recognize that the services/functions of "svm-based vehicle surrounding image check" and "rear seat passenger notification" are currently unused. Accordingly, in connection with the service/function of "svm-based vehicle surrounding image check" that is in the activated state but unused, the connected car server 3 may transfer the usage guidance information for guiding a using method of the service/function of "svm-based vehicle surrounding image check" to the user terminal 4. In addition, in connection with the service/function of "rear seat passenger notification" that is not yet activated, the connected car server 3 may transfer the usage guidance information for guiding a consent method, an activation processing method, or a fee plan subscription method, and the like, required for the activation, to the user terminal 4. At this time, through the big data analysis with respect to a usage pattern of the service/function of "svm-based vehicle surrounding image check" and the service/function of "rear seat passenger notification" of other users who use the service/function of "svm-based vehicle surrounding image check" and the service/function of "rear seat passenger notification", and through the vehicle information (position information, state information, and the like of the vehicle) and surrounding environment information (weather information, disaster information, traffic information, and the like, provided from the contents providing server 6) of the vehicle applied with the connected car terminal 1, the connected car server 3 may determine a transfer time point for a usage guidance information related to the service/function of "svm-based vehicle surrounding image check" and the service/function of "rear seat passenger notification". In other words, through the big data analysis, the connected car server 3 checks time point at which the service/function of "svm-based vehicle surrounding image check" and the service/function of "rear seat passenger notification" are required, available, or the like, and based on such, may derive an optimal guiding time point. For example, since the service/function of "svm-based vehicle surrounding image check" is frequently used for a user to find a vehicle position where the vehicle is parked, the connected car server 3 may determine, based on a parked state of the vehicle installed with the connected car terminal 1, the time point for providing the usage guidance information with respect to the service/function of "svm-based vehicle surrounding image check". For another example, since the service/function of "rear seat passenger notification" is mainly used in hot weather, or when a person/pet is in the rear seat of a vehicle, the connected car server 3 may determine, based on weather information around the vehicle installed with the connected car terminal 1, vehicle state information (whether a passenger exists), and the like, the time point for providing the usage guidance information with respect to the service/function of "rear seat passenger notification".

According an embodiment described above, based on the corresponding vehicle type, platform, version, subscription fee plan, and the like, the connected car service system automatically activates functions that may be automatically activated, among the connected car services/functions applied to a vehicle. Thus, convenience of a user who uses the connected car service system may be improved. In addition, with respect to a sevice/function that is unused by the user, a time point required for the user, a time point at which the service/function becomes available, and the like are estimated through the big data analysis, and the usage guidance information for inducing usage of the user is provided. Therefore, the service usage rate of the user may be increased by reducing unused services/functions that are caused because the user does not fully understand the connected car service system.

The method for providing the connected car service according to an embodiment may be executed through software. When executed with software, the components of the present disclosure are code segments that execute the necessary work. Program or code segments may be stored in a processor-readable medium or transmitted by a computer data signal combined with a carrier in a transmission medium or communication network.

The computer-readable medium includes all types of recording devices that store data that may be read by a computer system. Examples of computer-readable recording devices include ROM, RAM, CD-ROM, DVD_ROM, DVD_RAM, magnetic tape, floppy disk, hard disk, optical data storage, and the like. In addition, the computer-readable medium may be distributed to computer devices connected to one another through a network, such that computer-readable codes may be stored and executed in a distributed manner.

The drawings referenced herein and the detailed description of the described embodiments are merely examples of the present disclosure, which are used only for the purpose of describing the present disclosure. The described embodiments are not used for limiting the meaning or the range of the present disclosure described in claims. Therefore, those of ordinary skill in the art may easily select and replace from this. In addition, a person of ordinary skill in the art may omit some of the constituent elements described in this specification without degradation of performance or may add a constituent element to improve performance. In addition, a person of ordinary skill in the art may change the sequence of the method steps described in this specification according to the process environment or equipment. Therefore, the range of the present disclosure should be determined not by the described embodiment, but by the claims and their equivalents.

DESCRIPTION OF SYMBOLS

1: connected car terminal
2: communication network
3: connected car server
4: user terminal
5: vehicle controller/terminal
31: service/function information database
32: fee plan information database
33: customer information database
34: contents providing component
35: service manager component
36: big data analyzer component
41: the connected car service APP

What is claimed is:

1. A system for providing a connected car service, the system comprising:
   a connected car terminal mounted on a vehicle and configured to generate a first list of services/functions of the connected car service applied to a vehicle and to generate usage status information of services/functions included in the first list; and
   a connected car server configured to receive the usage status information from the connected car terminal, to identify an unused service/function among the services/functions included in the first list based on the usage status information, and to transfer usage guidance information for guiding a using method with respect to the unused service/function to a user terminal of a user of the connected car terminal so that the usage guidance information is displayed on a screen of the user terminal of the user,
   wherein the connected car server is configured to:
      receive vehicle information of the vehicle including at least one of position information of the vehicle, state information of the vehicle, or road information of a road on which the vehicle is running from the connected car terminal;
      collect usage status information of the connected car service of a plurality of users from a connected car terminal or a user terminal of each of the plurality of users;
      obtain usage pattern information of the unused service/function of other users who are using the unused service/function based on the usage status information of the plurality of users;
      determine an optimal guiding time point for transferring the usage guidance information to the user terminal of the user based on the usage pattern information of the unused service/function of the other users and the vehicle information of the vehicle; and
      transfer the usage guidance information to the user terminal of the user at the optimal guiding time point.

2. The system of claim 1, further comprising a contents providing server configured to provide contents,
   wherein the connected car server is further configured to determine the optimal guiding time point for transferring the usage guidance information based on.

3. The system of claim 2, wherein, when the unused service/function is in a deactivated state within the vehicle, the connected car server is configured to further include information on a method for activating the unused service/function in the usage guidance information to be transferred.

4. The system of claim 3, wherein:
   the connected car server is configured to transfer activation information to the user terminal of the user; and
   the user terminal of the user is configured to activate at least one menu item among menu items of a connected car service APP based on the activation information.

5. The system of claim 1, wherein:
   the connected car server is configured to set at least one among the services/functions included in the first list to an activated state based on vehicle type of the vehicle, platform or version of the connected car terminal of the vehicle, and the user's subscribed fee plan information, and to transfer activation information with respect to services/functions included in the first list to the connected car terminal of the vehicle; and the connected car terminal of the vehicle is configured to automatically activate at least one service/function applied to the vehicle based on the activation information.

6. The system of claim 5, wherein:
when a new service/function is applied within the vehicle due to installation of a new vehicle controller/terminal or the connected car terminal of the vehicle to the vehicle or a software update of the vehicle controller/terminal within the vehicle; the connected car terminal of the vehicle is configured to transfer a second list including the new service/function to the connected car server; and
the connected car server is configured to determine an activation state of the new service/function based on the vehicle type, the platform, the version, and the fee plan information, and to transfer activation information on the new service/function to the connected car terminal of the vehicle.

7. The system of claim 6, wherein the connected car terminal of the vehicle is configured to automatically activate the new service/function or maintain the new service/function to a deactivated state, based on activation information on the new service/function.

8. A method of a connected car server for providing a connected car service, the method comprising:
receiving usage status information of services/functions of the connected car service applied within a vehicle from a connected car terminal of the vehicle;
identifying an unused service/function among the services/functions based on the usage status information;
determining an optimal guiding time point for transferring a usage guidance information for guiding a using method with respect to the unused service/function to a user terminal of a user of the connected car terminal; and
transferring the usage guidance information to the user terminal of the user at the optimal guiding time point so that the usage guidance information is displayed on a screen of the user terminal of the user,
wherein the determining the optimal guiding time point comprises:
receiving vehicle information of the vehicle including at least one of position information of the vehicle, state information of the vehicle, or road information of a road on which the vehicle is running from the connected car terminal;
obtaining usage pattern information of the unused service/function of other users who are using the unused service/function based on usage status information of the connected car service of a plurality of users collected from a connected car terminal or a user terminal of each of the plurality of users; and
determining the optimal guiding time for transferring the usage guidance information based on the usage pattern information of the unused service/function of the other users and the vehicle information of the vehicle.

9. The method of claim 8,
wherein the determining the optimal guiding time for transferring the usage guidance information based on the usage pattern information and the vehicle information comprises determining the optimal guiding time for transferring the usage guidance information based on the usage pattern information, the vehicle information, and contents provided from a contents providing server, and
wherein the contents include at least one of weather information, traffic information, disaster information, or news information.

10. The method of claim 9, wherein, when the unused service/function is in a deactivated state within the vehicle, the usage guidance information further comprises information on a method for activating the unused service/function in the usage guidance information.

11. The method of claim 8, further comprising:
receiving a first list of services/functions applied to the vehicle from the connected car terminal of the vehicle;
setting at least one among the services/functions included in the first list to an activated state based on vehicle type of the vehicle, platform or version of the connected car terminal of the vehicle, and the user's subscribed fee plan information; and
transferring activation information with respect to services/functions included in the first list to the connected car terminal of the vehicle,
wherein the connected car terminal of the vehicle is configured to automatically activate at least one service/function applied to the vehicle based on the activation information.

12. The method of claim 11, further comprising transferring the activation information to the user terminal,
wherein the user terminal of the user is configured to activate at least one menu item among menu items of a connected car service APP based on the activation information.

13. The method of claim 11, further comprising:
receiving a second list including a new service/function from the connected car terminal of the vehicle according as the new service/function is applied within the vehicle due to installation of a new vehicle controller/terminal or the connected car terminal of the vehicle to the vehicle or a software update of the vehicle controller/terminal within the vehicle;
determining an activation state of the new service/function based on the vehicle type, the platform, the version, and the fee plan information; and
transferring activation information on the new service/function to the connected car terminal of the vehicle.

14. The method of claim 13, wherein the connected car terminal of the vehicle is configured to automatically activate the new service/function or maintain the new service/function to a deactivated state, based on activation information on the new service/function.

* * * * *